United States Patent
Kong et al.

(10) Patent No.: US 10,205,204 B2
(45) Date of Patent: Feb. 12, 2019

(54) BATTERY MODULE OF CARTRIDGE STACKING STRUCTURE

(71) Applicant: LG CHEM, LTD., Seoul (KR)

(72) Inventors: Byung O Kong, Daejeon (KR); Hyun Chul Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 340 days.

(21) Appl. No.: 15/034,383

(22) PCT Filed: Nov. 19, 2014

(86) PCT No.: PCT/KR2014/011102
§ 371 (c)(1),
(2) Date: May 4, 2016

(87) PCT Pub. No.: WO2015/080421
PCT Pub. Date: Jun. 4, 2015

(65) Prior Publication Data
US 2016/0268658 A1     Sep. 15, 2016

(30) Foreign Application Priority Data

Nov. 29, 2013 (KR) .................. 10-2013-0147108

(51) Int. Cl.
*H01M 10/6557* (2014.01)
*H01M 2/02* (2006.01)
(Continued)

(52) U.S. Cl.
CPC ..... *H01M 10/6557* (2015.04); *H01M 2/0207* (2013.01); *H01M 2/1077* (2013.01);
(Continued)

(58) Field of Classification Search
None
See application file for complete search history.

(56) References Cited

U.S. PATENT DOCUMENTS

| | | |
|---|---|---|
| 2003/0146734 A1 | 8/2003 | Kozu et al. |
| 2005/0100783 A1 | 5/2005 | Ro et al. |
| | (Continued) | |

FOREIGN PATENT DOCUMENTS

| | | |
|---|---|---|
| EP | 2 991 133 A1 | 3/2016 |
| EP | 3 018 733 A1 | 5/2016 |
| | (Continued) | |

OTHER PUBLICATIONS

Machine Translation of Korean Patent Publication 2012-0081821 (Year: 2012).*

(Continued)

*Primary Examiner* — Wyatt P McConnell
(74) *Attorney, Agent, or Firm* — Birch, Stewart, Kolasch & Birch, LLP

(57) ABSTRACT

Disclosed herein is a battery module configured to have a structure in which two or more unit cells are fixed to a cartridge and a plurality of cartridges is stacked, the battery module including unit cells having electrode terminals formed at one side thereof, cartridges for fixing the unit cells, and bus bars coupled with the electrode terminals for electrically connecting the unit cells with each other, wherein the unit cells are mounted to the cartridges such that the electrode terminals of the unit cells face each other in a state in which the unit cells are arranged in a line such that side surfaces of the unit cells are parallel to the ground, and the electrode terminals facing each other are connected to each other in parallel by the bus bars mounted to the cartridges to form a parallel unit cell connection structure for each of the cartridges, and the cartridges are stacked such that a plurality of parallel unit cell connection structures is arranged from the ground in a height direction.

28 Claims, 8 Drawing Sheets

(51) Int. Cl.

| | | |
|---|---|---|
| *H01M 2/10* | (2006.01) | |
| *H01M 2/20* | (2006.01) | |
| *H01M 10/6556* | (2014.01) | |
| *H01M 10/613* | (2014.01) | |
| *H01M 10/625* | (2014.01) | |
| *H01M 10/647* | (2014.01) | |
| *H01M 2/24* | (2006.01) | |
| *H01M 2/30* | (2006.01) | |
| *H01M 10/0525* | (2010.01) | |
| *H01M 10/52* | (2006.01) | |

(52) U.S. Cl.
    CPC ............ *H01M 2/206* (2013.01); *H01M 2/24* (2013.01); *H01M 2/305* (2013.01); *H01M 10/0525* (2013.01); *H01M 10/613* (2015.04); *H01M 10/625* (2015.04); *H01M 10/647* (2015.04); *H01M 10/6556* (2015.04); *H01M 10/52* (2013.01); *H01M 2220/10* (2013.01); *H01M 2220/20* (2013.01)

(56) References Cited

U.S. PATENT DOCUMENTS

| | | |
|---|---|---|
| 2008/0187820 A1 | 8/2008 | Nakano et al. |
| 2011/0039131 A1 | 2/2011 | Moon |
| 2012/0270074 A1 | 10/2012 | Koh |
| 2014/0141300 A1 | 5/2014 | Ronning et al. |
| 2014/0212722 A1 | 7/2014 | Lee et al. |
| 2014/0212723 A1 | 7/2014 | Lee et al. |

FOREIGN PATENT DOCUMENTS

| | | |
|---|---|---|
| JP | 2001-135674 A | 5/2001 |
| JP | 2003-17028 A | 1/2003 |
| JP | 2004-95357 A | 3/2004 |
| JP | 2011-40389 A | 2/2011 |
| JP | 2012-199255 A | 10/2012 |
| KR | 10-2005-0036751 A | 4/2005 |
| KR | 10-0689574 B1 | 3/2007 |
| KR | 10-2010-0081942 A | 7/2010 |
| KR | 10-2012-0081821 A | 7/2012 |
| KR | 10-2012-0123172 A | 11/2012 |
| KR | 10-2013-0048759 A | 5/2013 |
| KR | 10-1277250 B1 | 6/2013 |
| WO | WO 2011/108680 A1 | 9/2011 |
| WO | WO 2012/151190 A2 | 11/2012 |
| WO | WO 2013/080338 A1 | 6/2013 |
| WO | WO 2013/089468 A1 | 6/2013 |
| WO | WO 2013/089470 A1 | 6/2013 |

OTHER PUBLICATIONS

Extended European Search Report, dated Nov. 7, 2016, for European Application No. 14866442.8.

International Search Report for PCT/KR2014/011102 dated Feb. 12, 2015.

* cited by examiner

【FIG. 1】
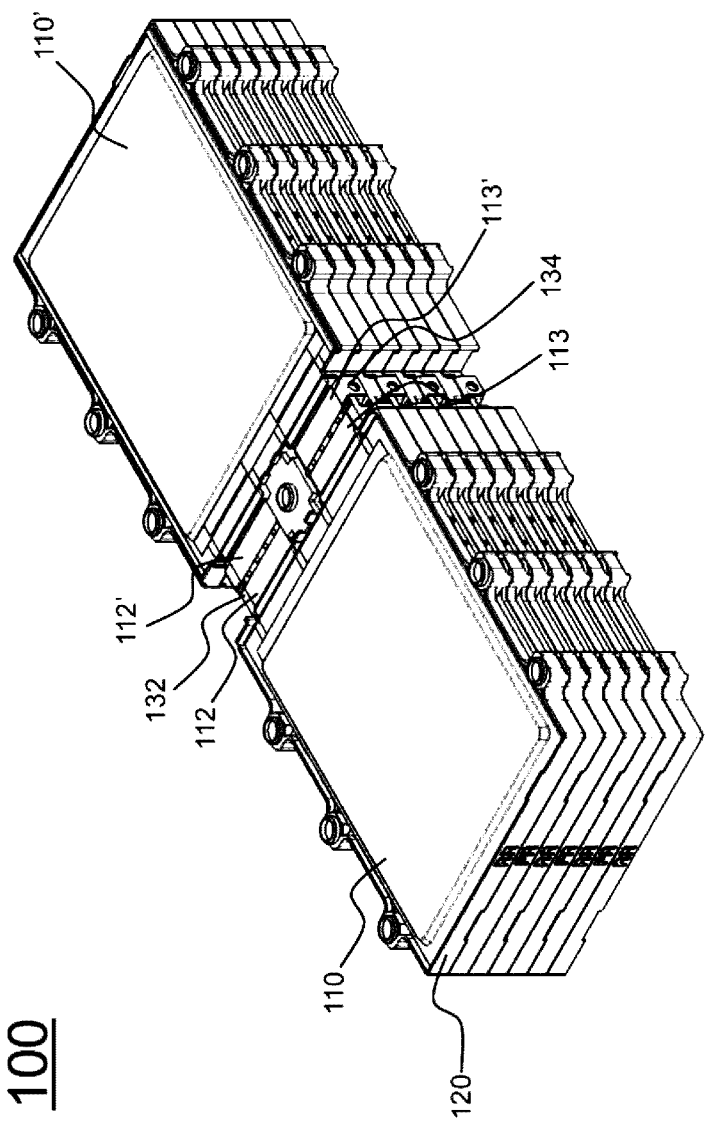

【FIG. 2】
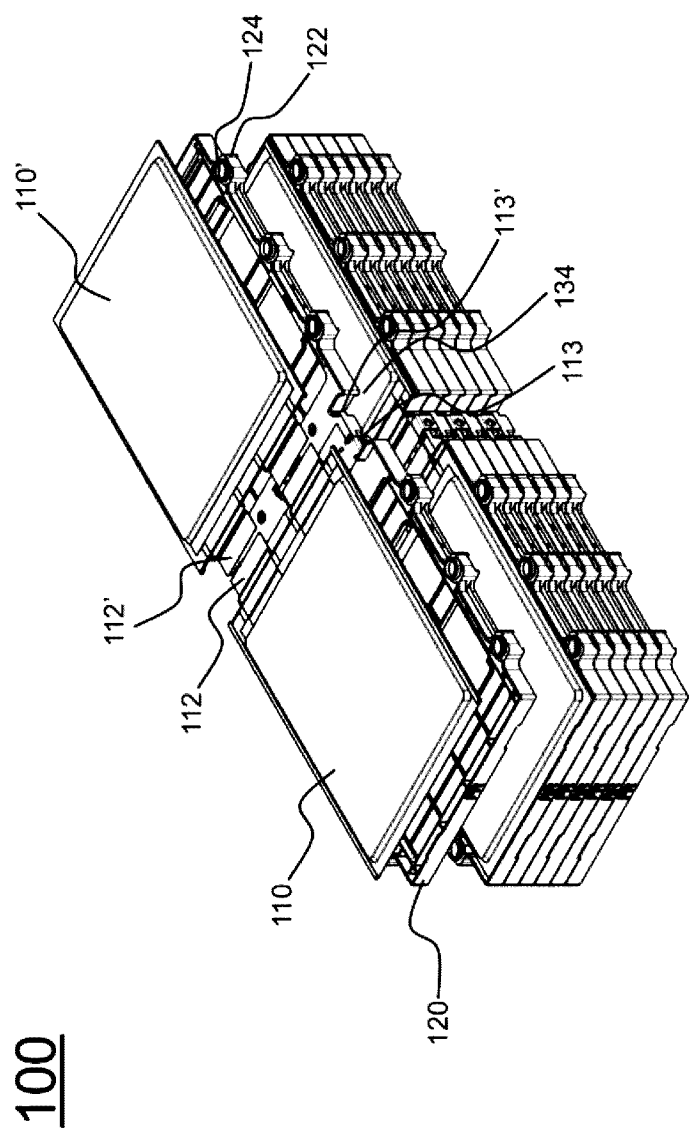

[FIG. 3]
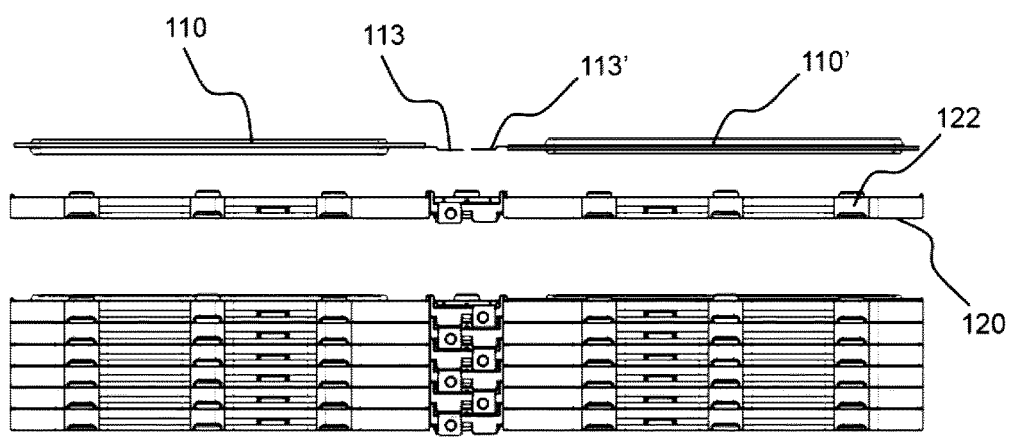

[FIG. 4]
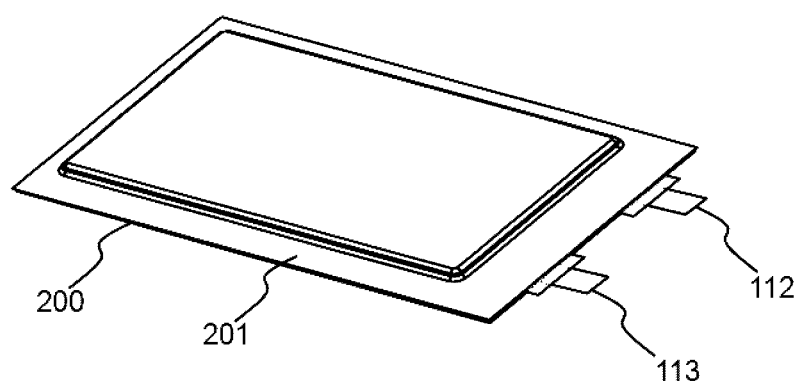

[FIG. 5]
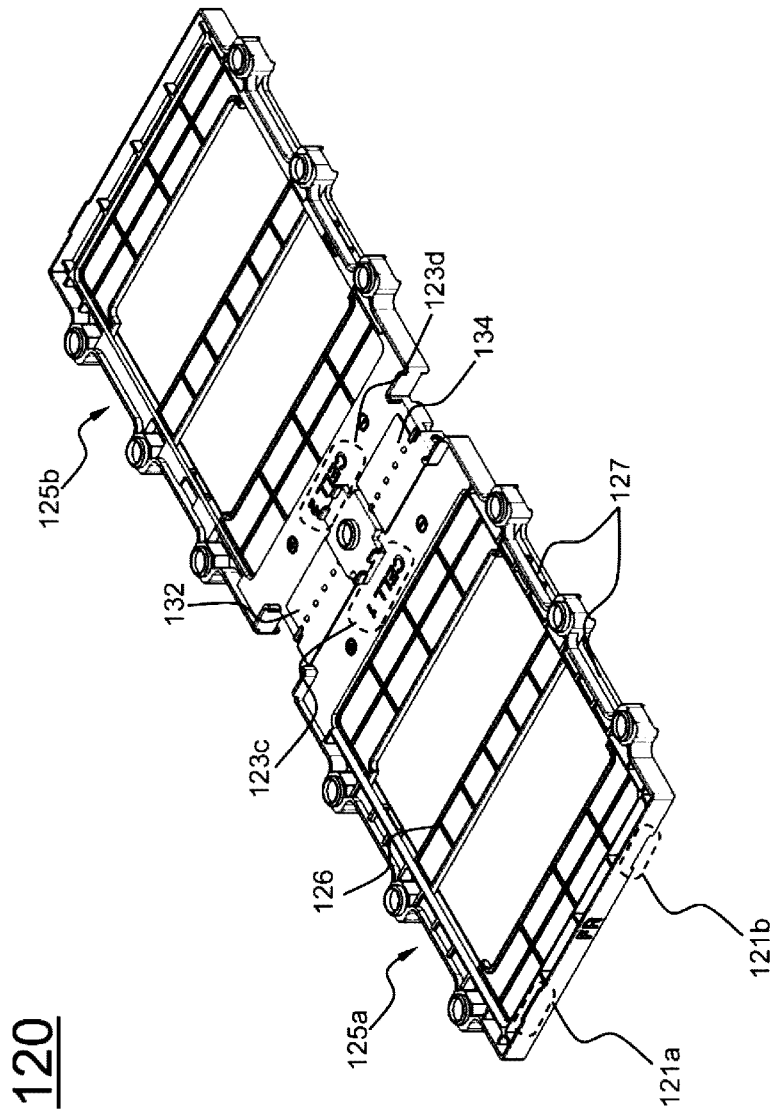

[FIG. 6]
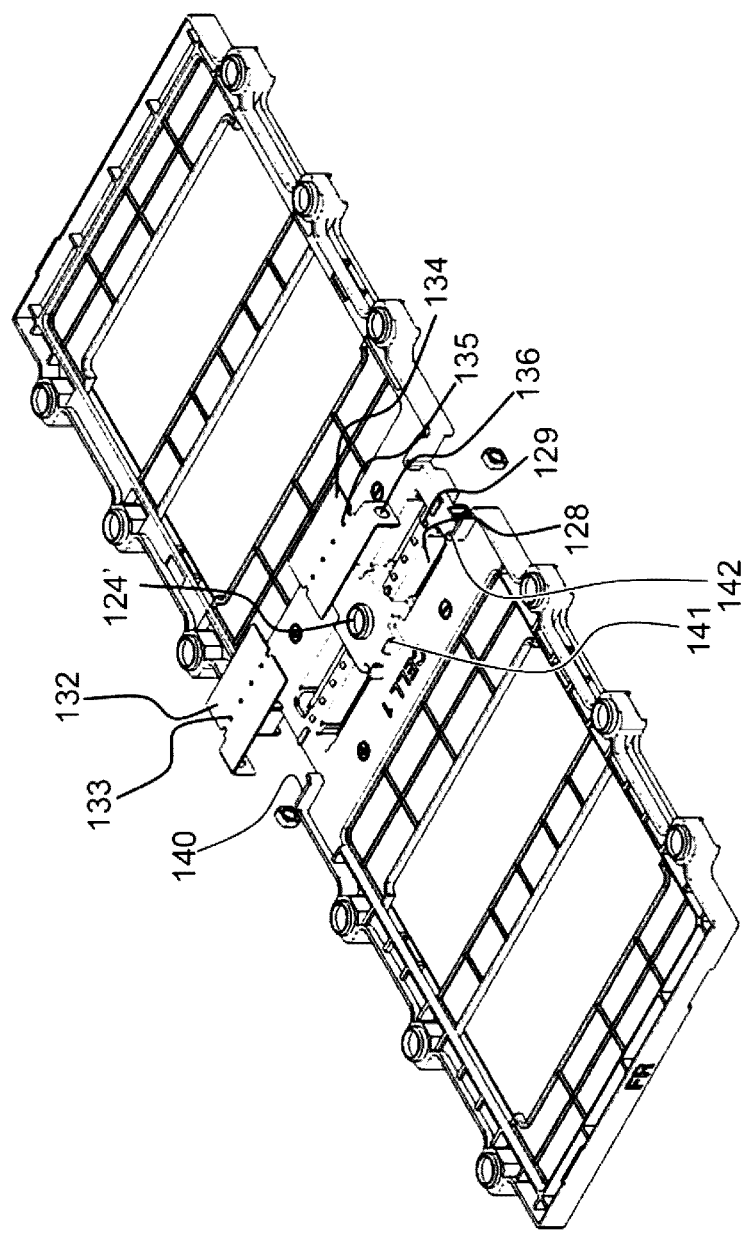

[FIG. 7]
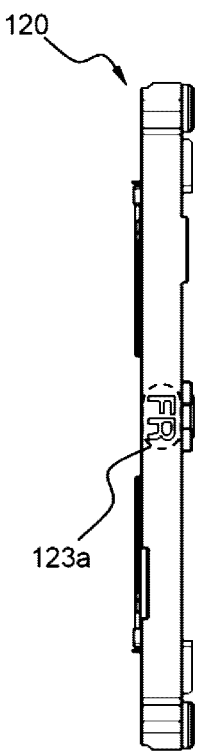

[FIG. 8]
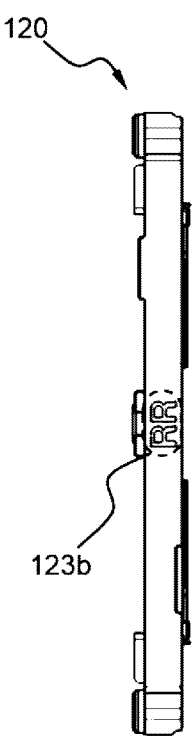

BATTERY MODULE OF CARTRIDGE STACKING STRUCTURE

TECHNICAL FIELD

The present invention relates to a battery module configured to have a structure in which battery cells are stacked in a state in which each of the battery cells is fixed to a corresponding cartridge.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles that use fossil fuels.

In addition, technology related to an electric power storage apparatus that stores electric power and stably supplies the stored electric power to a power system when needed has been developed. The electric power storage apparatus is an apparatus that stores electric power when electric power demand is low and supplies the stored electric power in the event of overload or emergency. The electric power storage apparatus has the effect of improving both the quality of electric power and energy efficiency. In particular, markets for a household electric power storage apparatus and a middle-sized industrial or commercial electric power storage apparatus have been rapidly expanding, because such electric power storage apparatuses are related to smart grid technology.

Meanwhile, in order for a battery module to provide the output and capacity required by a predetermined apparatus or device, it is necessary for the battery module to be configured to have a structure in which a plurality of battery cells is electrically connected to each other in series or in parallel. In addition, it is necessary for the battery module to be configured to have a structure that is easily extendable and remains stable as the capacity of the battery module is increased.

In particular, in a case in which a plurality of battery cells is used to constitute a battery module, a plurality of members, such as bus bars and power cables, is needed for mechanical fastening and electrical connection between the battery cells, and a cooling structure must also be included. As a result, a process of assembling the members is very complicated. In addition, in a case in which it is necessary to extend the battery module, it is difficult to modify the structure of the battery module. Furthermore, a plurality of components is additionally needed, which increases the cost of manufacturing the battery module.

In addition, during the manufacture of a battery module which includes a plurality of components and the structure of which is therefore complicated, it is difficult to detect incorrect assembly of the battery module. Incorrect assembly of the battery module may decrease the safety and reliability of the battery module and may increase a defect rate of the battery module.

DISCLOSURE

Technical Problem

The present invention has been made to solve the above problems and other technical problems that have yet to be resolved.

Specifically, it is an object of the present invention to provide a battery module, the cooling structure of which is improved in order to improve cooling efficiency, the incorrect assembly of which is prevented during the manufacture of the battery module, and which exhibits high structural stability.

Technical Solution

In accordance with one aspect of the present invention, the above and other objects can be accomplished by the provision of a battery module configured to have a structure in which two or more unit cells are fixed to a cartridge and a plurality of cartridges is stacked, the battery module including unit cells having electrode terminals formed at one side thereof, cartridges for fixing the unit cells, and bus bars coupled with the electrode terminals for electrically connecting the unit cells with each other, wherein the unit cells are mounted to the cartridges such that the electrode terminals of the unit cells face each other in a state in which the unit cells are arranged in a line such that side surfaces of the unit cells are parallel to the ground, and the electrode terminals facing each other are connected to each other in parallel by the bus bars mounted to the cartridges to form a parallel unit cell connection structure for each of the cartridges, and the cartridges are stacked such that a plurality of parallel unit cell connection structures is arranged from the ground in a height direction.

That is, the battery module according to the present invention is configured to have a structure in which a plurality of unit cells is connected to each other in parallel to form a parallel unit cell connection structure, and a plurality of parallel unit cell connection structures is stacked such that the parallel unit cell connection structures are connected to each other in parallel. Consequently, it is possible to easily assemble the battery module and to extend the parallel connection structure of the battery module.

In addition, in the battery module according to the present invention, the unit cells are specifically arranged and mounted on each of the cartridges. Consequently, the battery module has a compact structure and exhibits high structural stability.

In a concrete example, each of the unit cells may be a plate-shaped battery cell.

For example, the plate-shaped battery cell may be a pouch-shaped battery cell configured to have a structure in which an electrode assembly is mounted in a battery case made of a laminate sheet including a resin layer and a metal layer.

Specifically, the battery cell may be a pouch-shaped battery cell configured to have a structure in which an electrode assembly having a positive electrode/separator/negative electrode structure is contained in a battery case together with an electrolyte in a sealed state. The battery cell may be a plate-shaped battery cell configured to have an approximately rectangular hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the battery case of the pouch-shaped battery cell may be configured to have a structure in which an electrode assembly is received in a receiving part formed at the upper inner surface and/or the lower inner surface of a two-unit member, and the upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. Alternatively, the battery case may be configured to have a structure in which an electrode assembly is received in a receiving part formed at the upper inner surface and/or the lower inner surface of a one-unit member and in which the upper and lower contact regions of the outer edge of the battery case are sealed by thermal bonding.

The plate-shaped battery cell is not particularly restricted so long as the battery cell is capable of providing high voltage and high current when a battery module or a battery pack is constructed using the battery cell. For example, the battery cell may be a lithium secondary battery having high energy storage capacity per unit volume.

In a concrete example, each of the cartridges may be provided with a first unit cell mounting unit and a second unit cell mounting unit, in each of which one unit cell is mounted such that electrode terminals of the unit cells face each other, and the first unit cell mounting unit and the second unit cell mounting unit may extend in a line from the end of the first unit cell mounting unit to the end of the second unit cell mounting unit when viewed from the side.

That is, the first unit cell mounting unit and the second unit cell mounting unit are formed at each of the cartridges such that the first unit cell mounting unit and the second unit cell mounting unit correspond to the arrangement of the two unit cells in a state in which the respective unit cells are received in the first unit cell mounting unit and the second unit cell mounting unit.

Each of the cartridges may be provided at a portion of the inner surface thereof corresponding to the upper surface or the lower surface of each of the unit cells with at least one rib for supporting each of the unit cells while defining coolant flow channels.

In addition, each of the cartridges may be provided in sides thereof with openings communicating with the coolant flow channels. For example, the openings may be formed in the shape of a slit. A coolant is introduced in to the coolant flow channels, or is discharged from the coolant flow channels, through the openings. Consequently, coolant inlet openings may be formed in one side of each of the cartridges, and coolant outlet openings may be formed in the other side of each of the cartridges.

Each of the cartridges may be provided with at least one push prevention projection for supporting a portion of the outer circumferential surface of each of the unit cells at which the electrode terminals of the unit cells are located in order to prevent the unit cells from being pushed during welding of the bus bars to the electrode terminals of the unit cells while fixing the unit cells in position.

For example, the push prevention projection may be configured to have a structure for supporting opposite ends of the outer circumferential surface of each of the unit cells at which the electrode terminals are located and supporting a portion of each of the unit cells between the positive electrode terminal and the negative electrode terminal.

Meanwhile, each of the cartridges may be provided with at least one protrusion protruding upward or downward therefrom, and an adjacent cartridge may be provided with at least one recess corresponding to the protrusion, such that each of the cartridges is stacked in position on or under the adjacent cartridge. That is, when the cartridges are stacked, the cartridges may be coupled to each other in position by inserting the protrusion into the recess.

The protrusion and the recess may be provided at the outer circumferential surface of each of the cartridges in order to make it easy to check whether the cartridges are stacked in position.

Meanwhile, each of the cartridges may be provided on the surface thereof with letters or marks for guiding the location of the unit cells in position or for making it easy to check the positions of the cartridges when the cartridges are stacked. The letters or the marks formed on each of the cartridges enable the battery module to be correctly assembled and make it easy to check whether the battery module is defective in a state in which the battery module is assembled The letters or marks may be printed on the surface of each of the cartridges, or may be carved in the surface of each of the cartridges. The letters or marks may indicate at least one selected from among positions of the unit cells on each of the cartridges, positions of a positive electrode and a negative electrode of each of the unit cells, and indications of the front surface and the rear surface of each of the cartridges.

Meanwhile, the parallel unit cell connection structures may be fixed in a state in which the parallel unit cell connection structures are stacked. For example, each of the cartridges in the parallel unit cell connection structures may be provided at opposite sides thereof with protrusions having fastening holes formed therein such that the cartridges are coupled to each other by fastening members inserted through the fastening holes. That is, in a state in which the cartridges are stacked, the cartridges may be coupled to each other by inserting the fastening members through the fastening holes in the cartridges.

In the above structure, the protrusions formed at the opposite sides of each of the cartridges may be symmetrically arranged with respect to the middle of each of the cartridges such that the cartridges are stably coupled to each other.

According to circumstances, each of the cartridges may be provided in a middle part thereof with an additional fastening hole, through which a fastening member is inserted in order to couple the cartridges to each other.

The electrode terminals of the unit cells may be coupled to the bus bars through various methods. For example, the electrode terminals of the unit cells may be coupled to the bus bars by welding, soldering, or mechanical fastening. Specifically, the electrode terminals of the unit cells may be coupled to the bus bars by laser welding or ultrasonic welding.

In the parallel unit cell connection structure, the unit cells may be mounted to each of the cartridges in a state in which the unit cells are symmetrically arranged with respect to the bus bars. That is, the unit cells, the electrode terminals of which are connected to the bus bars, may be symmetrically arranged with respect to the bus bars. In this case, each of the cartridges, which fix the unit cells, may be symmetrically arranged with respect to the bus bars such that each of the cartridges corresponds to the unit cells.

According to circumstances, at least two of the bus bars may be connected to each other in series. In this case, the bus bars may be connected to each other in series by a series connection member. In the same manner as the bus bars, the series connection member may be provided in one end thereof with a coupling hole such that the series connection member is electrically and mechanically connected to the bus bars by inserting bolts, bolts and nuts, or self-clinching nuts through the coupling hole in the series connection member and coupling holes formed in the bus bars.

Consequently, it is possible to adjust or increase the capacity of the battery module by making parallel connections between the parallel unit cell connection structures. In addition, it is possible to adjust or increase the output of the battery module by making series connections between some of the parallel unit cell connection structures.

In a concrete example of the series connection between the parallel unit cell connection structures, the bus bars for parallel connection may include a first bus bar and a second bus bar. The first bus bar may be connected to a positive electrode terminal of each of the unit cells, and the second bus bar may be connected to a negative electrode terminal of each of the unit cells. In this case, the parallel unit cell connection structures may be stacked such that the first bus bar and the second bus bar in the parallel unit cell connection structure are alternately arranged.

The first bus bar and the second bus bar may be alternately arranged in various manners. For example, an upper cartridge may be stacked on a lower cartridge in a state in which the upper cartridge is rotated by 180 degrees relative to the lower cartridge in a plane such that the first bus bar and the second bus bar are alternately arranged.

That is, in the structure in which the cartridges are stacked in a state in which the first bus bar connected to the positive electrode terminal and the second bus bar connected to the negative electrode terminal are alternately arranged as described above, the first bus bar and the second bus bar may be connected to each other in the upper and lower cartridges, which are stacked using the series connection member, thereby achieving series connection.

Each of the cartridges may be provided with openings for welding, in which the bus bars are mounted. That is, openings may be formed in regions of the cartridge corresponding to regions at which the bus bars and the electrode terminals of the unit cells are welded such that the lower surfaces of the bus bars are exposed for welding.

The bus bars may be coupled to the cartridges using various methods. For example, the bus bars may be provided with fastening through holes, and each of the cartridges may be provided with fastening protrusions, which are inserted through the fastening through holes. Consequently, the bus bars may be coupled to the cartridges by coupling of the fastening protrusions through the fastening through holes.

Meanwhile, one end of each of the bus bars may be bent to the side surface of each of the cartridges, and may extend therefrom. An additional connection member may be connected to the bent and extending region of each of the bus bars such that the additional connection member is electrically connected to a lower or upper adjacent cartridge or an external input and output terminal.

In accordance with another aspect of the present invention, there is provided a battery pack including a battery module with the above-stated construction as a unit module.

The battery pack may be manufactured by combining a plurality of battery modules as the unit modules of the battery pack based on the desired output and capacity of the battery pack. In consideration of installation efficiency and structural stability, the battery pack may be used as a power source for a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle. However, the present invention is not limited thereto.

In accordance with a further aspect of the present invention, there is provided a device including the battery pack with the above-stated construction. Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery module according to an embodiment of the present invention;

FIG. 2 is a perspective view showing the battery module of FIG. 1, in which with the upper part of the battery module has been separated from the remaining part of the battery module;

FIG. 3 is a side view of FIG. 2;

FIG. 4 is a perspective view showing a battery cell, which constitutes a unit cell of the battery module of FIG. 1;

FIG. 5 is a perspective view showing a cartridge of FIG. 1;

FIG. 6 is a perspective view showing a structure in which bus bars are separated from the cartridge of FIG. 5;

FIG. 7 is a front view of FIG. 4; and

FIG. 8 is a rear view of FIG. 4.

BEST MODE

Now, exemplary embodiments of the present invention will be described in detail with reference to the accompanying drawings. It should be noted, however, that the scope of the present invention is not limited by the illustrated embodiments.

For the convenience of description, a module case, an external input and output terminal, and a protection circuit module, which are included in a general battery module, are omitted from the accompanying drawings.

FIG. 1 is a perspective view showing a battery module according to an embodiment of the present invention.

Referring to FIG. 1, a battery module 100 is configured to have a structure including unit cells 110 and 110', at one side of which electrode terminals 112, 113, 112', and 113' are formed, cartridges 120 for fixing the unit cells 110 and 110', and bus bars 132 and 134 coupled to the electrode terminals 112, 113, 112', and 113' for electrically connecting the unit cells 110 and 110' to each other.

The unit cells 110 and 110' are mounted to the cartridges 120 such that the electrode terminals 112, 113, 112', and 113' face each other, and the electrode terminals 112, 113, 112', and 113' are connected to each other in parallel by the bus bars 132 and 134, which are mounted to the cartridges 120 such that the unit cells are connected to each other in parallel in the cartridges 120.

The cartridges 120 are stacked in a vertical direction such that the unit cells, which are connected to each other in parallel, are arranged from the ground in the height direction.

FIG. 2 is a perspective view showing the battery module of FIG. 1, in which with the upper part of the battery module has been separated from the remaining part of the battery module, and FIG. 3 is a side view of FIG. 2.

Referring to FIGS. 2 and 3 together with FIG. 1, protrusions 122 having therein fastening holes 124 are formed on opposite sides of each of the cartridges 120 such that fastening members (not shown) are inserted through the fastening holes 124 in the cartridges 120 after the cartridges 120 are stacked in order to fix the cartridges 120 in a state in which the cartridges 120 are stacked. The protrusions 122 formed on each of the cartridges 120 are symmetrically arranged with respect to the middle of each of the cartridges 120.

FIG. 4 is a perspective view showing a battery cell, which constitutes a unit cell of the battery module of FIG. 1.

Referring to FIG. 4, a battery cell 110 is a plate-shaped battery cell 110 having electrode terminals (i.e. a positive electrode terminal 112 and a negative electrode terminal 113) formed at one end thereof. Specifically, the plate-shaped battery cell 110 is configured to have a structure in which an electrode assembly (not shown) is mounted in a pouch-shaped case 200 made of a laminate sheet including a metal layer (not shown) and a resin layer (not shown), and the edge of the pouch-shaped case 200 is thermally bonded to form a sealed portion 201. In general, the plate-shaped battery cell 110 may also be referred to as a 'pouch-shaped battery cell.'

FIG. 5 is a perspective view showing a cartridge of FIG. 1, and FIG. 6 is a perspective view showing a structure in which bus bars are separated from the cartridge of FIG. 5.

Referring to FIGS. 5 and 6 together with FIG. 2, a cartridge 120 is provided with a first unit cell mounting unit 125a and a second unit cell mounting unit 125b, in which two unit cells 110 and 110' are mounted such that electrode terminals 112, 113, 112', and 113' of the unit cells 110 and 110' face each other.

The cartridge 120 is configured such that regions of the cartridge 120 corresponding to the upper surfaces or the lower surfaces of the unit cells 110 and 110' are open when the unit cells 110 and 110' are mounted in the first unit cell mounting unit 125a and the second unit cell mounting unit 125b, respectively. A rib 126 is formed such that the rib 126 crosses the open region of a corresponding one of the unit cell mounting units of the cartridge in order to support each of the unit cells while defining coolant flow channels. That is, when unit cells are mounted to the upper surface and the lower surface of the cartridge 120, a space is provided between the unit cells by the open regions of the cartridge 120. The space is divided by the rib 126 to define the cooling flow channels. In addition, openings 127, which communicate with the cooling flow channels, are formed in opposite sides of the cartridge such that a coolant is introduced or discharged through the openings 127.

Openings 128 for welding are formed in regions of the cartridge 120 at which bus bars 132 and 134 are mounted. Specifically, openings 128 are formed in regions of the cartridge 120 corresponding to regions at which the bus bars 132 and 134 and the electrode terminals of the unit cells are welded such that the lower surfaces of the bus bars 132 and 134 are exposed for welding.

In addition, fastening protrusions 129 are formed on the cartridge 120, and fastening through holes 133 and 135 corresponding to the fastening protrusions 129 are formed in the bus bars 132 and 134 such that the bus bars 132 and 134 are coupled to the cartridge 120 by the coupling of the fastening protrusions 129 through the fastening through holes 133 and 135.

One end of each of the bus bars 132 and 134 is bent to the side surface of the cartridge 120 and extends therefrom, and the bent and extending region of each of the bus bars 132 and 234 is provided with a fastening hole 136, which is connected with a fastening hole in an upper adjacent bus bar or a lower adjacent bus bar in series or in parallel using an additional connection member in a state in which the cartridges are stacked. According to circumstances, an external input and output terminal may be connected to the fastening hole 136.

Protrusions 122 having therein fastening holes 124 are formed on opposite sides of the cartridge 120 such that the protrusions 122 are symmetrically arranged with respect to the middle of the cartridge 120, and an additional fastening hole 124' is formed in the middle part of the cartridge 120. In the structure in which the cartridges are stacked vertically, fastening members (not shown) are inserted through the fastening holes 124 and 124' in order to fix the cartridges.

In addition, the cartridge 120 is provided at the upper surface thereof with protrusions 121a and is provided at the lower surface thereof with recesses 121b such that the cartridge 120 is stacked in position on or under an adjacent cartridge. When the cartridges are stacked, the protrusions 121a are inserted into the recesses 121b such that the cartridges can be coupled to each other in position. Specifically, the protrusions 121a and the recesses 121b are formed at the outer circumferential surface of the cartridge 120 in order to make it easy to check whether the cartridges are stacked in position.

Meanwhile, the cartridge 120 is provided with push prevention projections 140, 141, and 142 for supporting opposite ends of the outer circumferential surface of each of the unit cells at which the electrode terminals are located and supporting a portion of each of the unit cells between the positive electrode terminal and the negative electrode terminal. When the unit cells are mounted to the cartridge 120, the push prevention projections 140, 141, and 142 comes into tight contact with the remaining portion of the outer circumferential surface of each of the unit cells from which the electrode terminals protrude, excluding the electrode terminals, in order to fix the unit cells in position. Consequently, it is possible for the push prevention projections 140, 141, and 142 to prevent the unit cells from moving in the cartridge 120 due to external force and thus to prevent the welded portion of each of the unit cells from being cut or broken due to the movement of the unit cells.

FIG. 7 is a front view of FIG. 4, and FIG. 8 is a rear view of FIG. 4.

Referring to FIGS. 7 and 8, letters 123a and 123b, that is, 'FR' and 'RR', which respectively indicate the front surface and the rear surface, are formed on the cartridge 120. The letters 123a and 123b are formed on the front surface and the rear surface of the cartridge 120 such that the letters 123a and 123b are visible when the cartridges are stacked.

In addition, as shown in FIG. 5, letters 123c and 123d, which indicate 'CELL 1' and 'CELL 2', which correspond to unit cells to be mounted in the first unit cell mounting unit and the second unit cell mounting unit, are formed on the cartridge 120.

The letters 123a, 123b, 123c, and 123d enable a user to easily check whether the cartridges are stacked in position and enable the unit cells to be mounted in position, thereby preventing incorrect assembly of the battery module and making it easy to check whether the battery module is defective in a state in which the battery module is assembled.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention is configured to have a structure in which a plurality of unit cells is connected to each other in parallel to form a parallel unit cell connection structure, and a plurality of parallel unit cell connection structures is stacked in a state in which the parallel unit cell connection structures are connected to each other in series or in parallel. Consequently, it is possible to easily assemble the battery module and to extend the structure of the battery module in parallel or in series through a simple process.

In addition, coolant flow channels are defined inside each cartridge, thereby improving cooling efficiency. Furthermore, incorrect assembly of the battery module is prevent using the letters, marks, protrusions, and recesses formed at the cartridge, thereby improving reliability in assembling the battery module.

The invention claimed is:

1. A battery module
comprising unit cells having electrode terminals formed at one side thereof, cartridges for fixing the unit cells, and bus bars coupled with the electrode terminals for electrically connecting the unit cells with each other, wherein
each cartridge has an upper surface and a lower surface,
two or more unit cells are mounted to each of the cartridges at the upper surface such that the electrode terminals of the unit cells face each other in a state in which the two or more unit cells are coplanar such that side surfaces of the unit cells are parallel to a ground, and the electrode terminals facing each other are connected to each other in parallel by the bus bars mounted to each of the cartridges to form a parallel unit cell connection structure for each of the cartridges, and
the cartridges are stacked such that a plurality of parallel unit cell connection structures is arranged from the ground in a height direction.

2. The battery module according to claim 1, wherein each of the unit cells is a plate-shaped battery cell.

3. The battery module according to claim 2, wherein the plate-shaped battery cell is configured to have a structure in which an electrode assembly is mounted in a battery case made of a laminate sheet comprising a metal layer and a resin layer, and an outer edge of the battery case is sealed.

4. The battery module according to claim 2, wherein the plate-shaped battery cell is a lithium secondary battery.

5. The battery module according to claim 1, wherein the two or more unit cells includes a first unit cell and a second unit cell, and
each of the cartridges is provided with a first unit cell mounting unit and a second unit cell mounting unit, in each of which first unit cell and second unit cell are respectively mounted such that electrode terminals of the first unit cell and the second unit cell face each other, and the first unit cell mounting unit and the second unit cell mounting unit extend in a line from an end of the first unit cell mounting unit to an end of the second unit cell mounting unit when viewed from a side.

6. The battery module according to claim 1, wherein each of the cartridges is provided at a portion of an inner surface thereof corresponding to an upper surface or a lower surface of each of the two or more unit cells with at least one rib for supporting each of the two or more unit cells while defining coolant flow channels.

7. The battery module according to claim 6, wherein each of the cartridges is provided in sides thereof with openings communicating with the coolant flow channels.

8. The battery module according to claim 1, wherein each of the cartridges is provided with at least one push prevention projection for supporting a portion of an outer circumferential surface of each of the two or more unit cells, the at least one push prevention projection being provided at a location next to the electrode terminals in order to prevent the two or more unit cells from being pushed during welding of the bus bars to the electrode terminals of the two or more unit cells while fixing the two or more unit cells in position.

9. The battery module according to claim 8, wherein the push prevention projection is configured to have a structure for supporting opposite ends of the outer circumferential surface of each of the two or more unit cells and supporting a portion of each of the unit cells between a positive electrode terminal and a negative electrode terminal of the electrode terminals.

10. The battery module according to claim 1, wherein each of the cartridges is provided with at least one protrusion protruding upward or downward therefrom, and an adjacent cartridge is provided with at least one recess corresponding to the protrusion, such that each of the cartridges is stacked in position on or under the adjacent cartridge.

11. The battery module according to claim 10, wherein each cartridge is provided with a protrusion in one of the upper surface and the lower surface, and each cartridge is provided with a recess in the other of the upper surface and lower surface opposite the protrusion such that the protrusion and the recess are provided at an outer circumferential surface of each of the cartridges.

12. The battery module according to claim 1, wherein each of the cartridges is provided on a surface thereof with letters or marks for guiding locations of the two or more unit cells in position or to check positions of the cartridges when the cartridges are stacked.

13. The battery module according to claim 12, wherein the letters or marks are printed on the surface of each of the cartridges or carved in the surface of each of the cartridges.

14. The battery module according to claim 12, wherein the letters or marks indicate at least one selected from among positions of the two or more unit cells on each of the cartridges, positions of a positive electrode and a negative electrode of each of the two or more unit cells, and indications of a front surface and a rear surface of each of the cartridges.

15. The battery module according to claim 1, wherein each of the cartridges is provided at each side thereof with at least one protrusion having a fastening hole formed therein such that the cartridges are coupled to each other by a fastening member inserted through the fastening hole.

16. The battery module according to claim 15, wherein the protrusions formed at the opposite sides of each of the cartridges are symmetrically arranged with respect to a middle of each of the cartridges.

17. The battery module according to claim 1, wherein each of the cartridges is provided at a middle part thereof with a fastening hole, through which a fastening member is inserted in order to couple the cartridges to each other.

18. The battery module according to claim 1, wherein the electrode terminals of the two or more unit cells are coupled to the bus bars by laser welding or ultrasonic welding.

19. The battery module according to claim 1, wherein, in the parallel unit cell connection structure, the two or more unit cells are mounted to each of the cartridges in a state in which the two or more unit cells are symmetrically arranged with respect to the bus bars.

20. The battery module according to claim 1, wherein at least two of the bus bars are connected to each other in series by a series connection member.

21. The battery module according to claim 1, wherein the bus bars comprise a first bus bar connected to a positive electrode terminal of each of the two or more unit cells and a second bus bar connected to a negative electrode terminal of each of the two or more unit cells, and the cartridges are stacked such that the first bus bar and the second bus bar in the parallel unit cell connection structure are alternately arranged.

22. The battery module according to claim 21, wherein an upper cartridge is stacked on a lower cartridge in a state in which the upper cartridge is rotated by 180 degrees relative to the lower cartridge in a plane such that the first bus bar and the second bus bar are alternately arranged.

23. The battery module according to claim 1, wherein each of the cartridges is provided with openings for welding, in which the bus bars are mounted.

24. The battery module according to claim 1, wherein the bus bars are provided with fastening through holes, and each of the cartridges is provided with fastening protrusions, which are inserted through the fastening through holes.

25. The battery module according to claim 1, wherein one end of each of the bus bars is bent to a side surface of each of the cartridges and extends along the side surface.

26. A battery pack comprising a battery module according to claim 1 as a unit module.

27. A device comprising a battery pack according to claim 26.

28. The device according to claim 27, wherein the device is a household power supply, a power supply for public facilities, a power supply for stores, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

\* \* \* \* \*